(12) United States Patent
Park et al.

(10) Patent No.: US 12,551,165 B2
(45) Date of Patent: Feb. 17, 2026

(54) ELECTROCARDIOGRAM LEAD GUIDE SYSTEM AND METHOD

(71) Applicant: MEZOO CO., LTD., Wonju-si (KR)

(72) Inventors: Jung Hwan Park, Wonju-si (KR); Sung Pil Cho, Wonju-si (KR); Mi Hye Song, Seoul (KR); Jae Yeon Shin, Wonju-si (KR); Hun Shim, Wonju-si (KR); Jun Hyun Park, Wonju-si (KR)

(73) Assignee: MEZOO CO., LTD., Wonju-si (KR)

( * ) Notice: Subject to any disclaimer, the term of this patent is extended or adjusted under 35 U.S.C. 154(b) by 382 days.

(21) Appl. No.: 17/786,416

(22) PCT Filed: Dec. 4, 2020

(86) PCT No.: PCT/KR2020/017688
§ 371 (c)(1),
(2) Date: Jun. 16, 2022

(87) PCT Pub. No.: WO2021/125650
PCT Pub. Date: Jun. 24, 2021

(65) Prior Publication Data
US 2023/0020836 A1    Jan. 19, 2023

(30) Foreign Application Priority Data

Dec. 16, 2019  (KR) .......................... 10-2019-0167670

(51) Int. Cl.
*A61B 5/00* (2006.01)
*A61B 5/28* (2021.01)
*A61B 5/332* (2021.01)

(52) U.S. Cl.
CPC .............. *A61B 5/684* (2013.01); *A61B 5/28* (2021.01); *A61B 5/332* (2021.01); *A61B 2562/0219* (2013.01)

(58) Field of Classification Search
CPC ........... A61B 5/684; A61B 5/332; A61B 5/28; A61B 2562/02019
See application file for complete search history.

(56) References Cited

U.S. PATENT DOCUMENTS 6,282,440 B1    8/2001  Brodnick et al.
2011/0306859 A1*  12/2011  Saldivar .............. A61B 5/6823
                                                          607/9

(Continued)

FOREIGN PATENT DOCUMENTS

CN    105997049 A    10/2016
CN    108903934 A    11/2018

(Continued)

OTHER PUBLICATIONS

International Search Report - PCT/KR2020/017688 dated Mar. 11, 2021.

(Continued)

*Primary Examiner* — Benjamin J Klein
*Assistant Examiner* — Willow Grace Welch
(74) *Attorney, Agent, or Firm* — CANTOR COLBURN LLP (57) ABSTRACT

Provided is an electrocardiogram lead guide system. The electrocardiogram lead guide system may include: an electrocardiograph attached to a part of a body of a patient and acquiring posture information and electrocardiogram signals using a plurality of sensors; and a user terminal providing guide information for guiding the attachment direction of the electrocardiograph based on the posture information.

6 Claims, 4 Drawing Sheets

(56) References Cited

U.S. PATENT DOCUMENTS

| | | | | |
|---|---|---|---|---|
| 2014/0194760 A1* | 7/2014 | Albert | ................... | A61B 5/33 |
| | | | | 600/509 |
| 2014/0330334 A1* | 11/2014 | Errico | ............... | A61N 1/36034 |
| | | | | 607/45 |
| 2015/0374251 A1* | 12/2015 | Yoshioka | ................ | A61B 5/30 |
| | | | | 600/386 |
| 2017/0304640 A1* | 10/2017 | Sato | ................... | A61N 1/3993 |
| 2020/0305795 A1* | 10/2020 | Floyd | .................. | A61B 5/6814 |

FOREIGN PATENT DOCUMENTS

| | | | | | |
|---|---|---|---|---|---|
| JP | 2016026547 | A | | 2/2016 | |
| KR | 20100024118 | | | 3/2010 | |
| KR | 20130104277 | A | | 9/2013 | |
| KR | 20140003350 | | | 1/2014 | |
| KR | 20150050005 | | | 5/2015 | |
| KR | 20150095439 | | | 8/2015 | |
| KR | 20150095439 | A | * | 8/2015 | ........... A61B 5/1116 |
| KR | 20170002184 | | | 1/2017 | |
| KR | 20180018489 | | | 2/2018 | |
| KR | 102134205 | | | 7/2020 | |

OTHER PUBLICATIONS

Korean Office Action—Korean Application No. 10-2019-0167670 issued on Mar. 27, 2020, citing KR 2015-0095439, KR 2015-0050005, and KR 2017-0002184.

\* cited by examiner

ELECTROCARDIOGRAM LEAD GUIDE SYSTEM AND METHOD

TECHNICAL FIELD

The present invention relates to electrocardiogram lead guide system and method.

BACKGROUND ART

An electrocardiograph is a device that detects and amplifies the electromotive force generated by cardiac muscle activity as a potential difference between two points on the body surface and then displays the electromotive force as a waveform on a recording paper. In general, the electrocardiogram is used to diagnose heart disease by analyzing the minute waveform that records the potential difference generated in the heart and both arms and legs, which are the extremities of the body. The electrocardiograph includes electrocardiographs used in hospitals or medical institutions, portable electrocardiographs that can be used at home or in daily life, and wearable electrocardiographs, and the like, and recently, an electrocardiograph that is connected to a smartphone and measurable has also been developed.

For electrocardiogram lead, medically and academically, measurement directions Lead I, II, III, aVL, aVR, aVF, V1, V2, V3, V4, V5, and V6 have already been standardized. In a wearable or attachable electrocardiograph without a separate lead line having a degree of freedom, the electrocardiogram lead is measured differently depending on an attachment direction of the electrocardiograph. When the wearable or attachable electrocardiograph is attached, there is a problem in that it is difficult to obtain an intended electrocardiogram lead signal if a standard lead direction is not accurately aligned. Current products are fixed in a specific direction to measure the electrocardiogram.

Meanwhile, there are cases in which the electrocardiogram lead needs to be applied differently depending on the patient's symptoms and specifics. In this case, when a non-medical person who is not a skilled medical person self-wears the electrocardiograph, there may be a problem in that accurate electrocardiogram signals cannot be obtained because the electrocardiograph is attached in an incorrect direction.

The background art of the present invention is disclosed in Korean Patent Publication No. 10-2018-0018489.

DISCLOSURE

Technical Problem

The present invention is to solve the problems of the related art, and an object of the present invention is to provide electrocardiogram lead guide system and method which guide a user to attach an electrocardiograph in a user's intended electrocardiogram lead direction by detecting an attachment direction (position, angle, etc.) of the electrocardiograph using a (motion) sensor embedded in the electrocardiograph and transmitting the detected attachment direction to a mobile terminal (smartphone, tablet, PC) by wireless (Bluetooth, Wi-Fi, etc.).

Objects of the present invention are not limited to the above-mentioned objects, and other objects, which are not mentioned above, can be clearly understood by those skilled in the art from the following descriptions.

Technical Solution

As a technical means for achieving the technical problem, according to an exemplary embodiment of the present invention, an electrocardiogram lead guide system may include: an electrocardiograph attached to a part of a body of a patient and acquiring posture information and electrocardiogram signals using a plurality of sensors; and a user terminal providing guide information for guiding the attachment direction of the electrocardiograph based on the posture information.

The electrocardiograph may include a sensor unit acquiring position and angle information of the electrocardiograph using a plurality of sensors, a generation unit predicting current posture information of the electrocardiograph based on the position and angle information of the electrocardiograph acquired by the sensor unit, a detection unit detecting the attachment with the part of the body of the patient, and a communication unit transmitting the current posture information and the electrocardiogram lead signals to the user terminal.

The sensor unit may acquire the position and angle information of the electrocardiograph using an acceleration sensor and a gyro sensor.

The generation unit may estimate an angle difference between preset first reference posture information and the current posture information, estimate an angle difference between preset second reference posture information and the current posture information, and estimate an angle difference between preset third reference posture information and the current posture information.

The communication unit may provide, to the user terminal, the angle difference information estimated by the generation unit and electrocardiogram signals, when the attachment detected by the detection unit is On, and provide, to the user terminal, the angle difference information estimated by the generation unit, when the attachment detected by the detection unit is Off.

The user terminal may include a user input receiving unit receiving user input information selecting at least one of a plurality of reference direction information items, and a guide information providing unit providing guide information based on the user input information and the angle difference information, in which the guide information providing unit may provide guide information for guiding the attachment direction of the electrocardiograph based on the user input information and the angle difference information between the preset reference posture information received from the electrocardiograph and the current posture information.

The guide information providing unit may vary output characteristics of the guide information based on the attachment direction of the electrocardiograph associated with the reference direction information corresponding to the user input information and the angle difference information between the preset reference posture information received by the electrocardiograph and the current posture information.

According to an exemplary embodiment of the present invention, an electrocardiogram lead guide method may include steps of acquiring, by an electrocardiograph attached to a part of a body of a patient, posture information and electrocardiogram signals using a plurality of sensors, and providing, by a user terminal, guide information for guiding the attachment direction of the electrocardiograph based on the posture information.

The above-mentioned aspects are merely exemplary and should not be construed as limiting the present invention. In addition to the above-described exemplary embodiments, additional exemplary embodiments may exist in the drawings and detailed description of the invention.

Advantageous Effects

According to the technical solution of the present invention, it is possible to attach an electrocardiograph in an accurate direction by a non-medical person who is not a skilled medical person by providing a method for guiding a user to attach an electrocardiograph in a user's intended electrocardiogram lead direction by detecting an attachment direction (position, angle, etc.) of the electrocardiograph using a (motion) sensor embedded in the electrocardiograph and transmitting the detected attachment direction to a mobile terminal (smartphone, tablet, PC) by wireless (Bluetooth, Wi-Fi, etc.).

The effects according to the present invention are not limited to the contents exemplified above, and more various effects are included in the present specification.

BEST MODE

Hereinafter, exemplary embodiments of the present invention will be described in detail so as to be easily implemented by those skilled in the art, with reference to the accompanying drawings. However, the present invention may be embodied in many different forms and is not limited to the exemplary embodiments to be described herein. In addition, parts not related to the description have been omitted in order to clearly describe the present invention in the drawings and throughout this specification, like reference numerals designate like elements.

Further, throughout this specification, when a certain part is "connected" with the other part, the certain part may be "directly connected" with the other part and "electrically connected" or "indirectly connected" with the other part with another element interposed therebetween.

Throughout this specification, it will be understood that when a certain member is located "on", "above", "at the top of", "under", "below", and "at the bottom of" the other member, a certain member is in contact with the other member and another member may also be present between the two members.

Throughout this specification, when a certain part "comprises" a certain component, unless otherwise disclosed to the contrary, it is meant that the part may further comprise another component without excluding another component.

The present invention relates to a method and a system which guide a user to attach an electrocardiograph in a user's intended electrocardiogram lead direction by detecting an attachment direction (position, angle, etc.) of the electrocardiograph using a motion sensor embedded in the wearable or attachable electrocardiograph without a separate lead line and transmitting the detected attachment direction to a mobile terminal (smartphone, tablet, PC) by wireless (Bluetooth, Wi-Fi, etc.).

Figure 1:
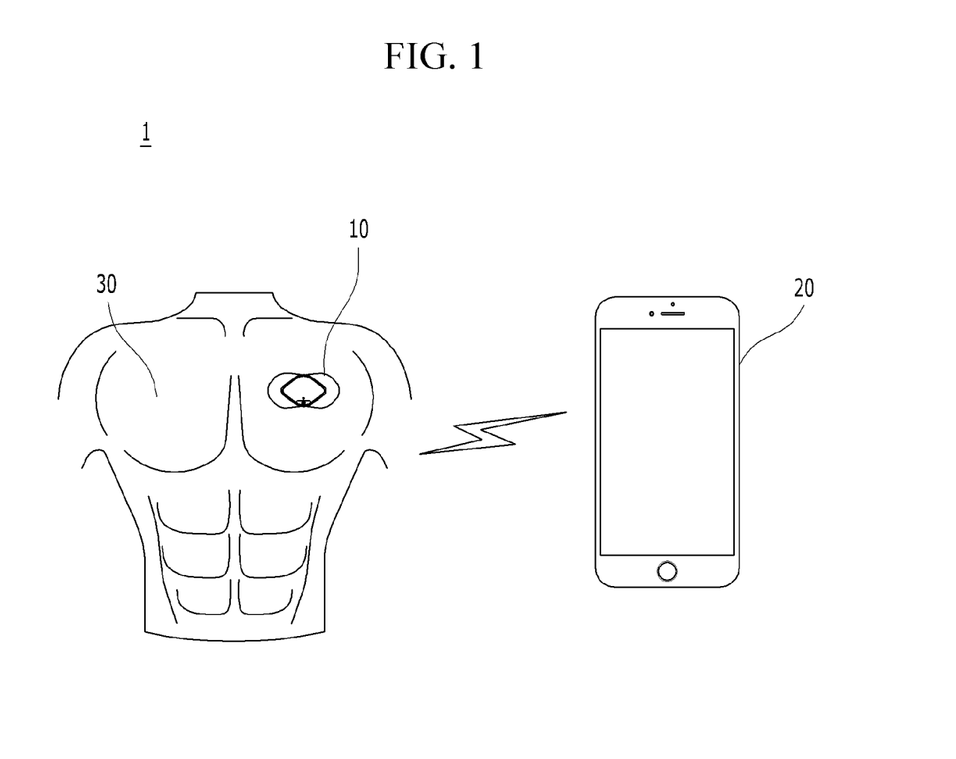
FIG. 1 is a schematic configuration diagram of an electrocardiogram lead guide system according to an exemplary embodiment of the present invention.

FIG. 1 is a schematic configuration diagram of an electrocardiogram lead guide system according to an exemplary embodiment of the present invention.

Referring to FIG. 1, an electrocardiogram lead guide system 1 may include an electrocardiograph 10 and a user terminal 20.

According to an exemplary embodiment of the present invention, the electrocardiograph 10 may be attached to a part of the body of a patient 30. In addition, the electrocardiograph 10 may acquire posture information and electrocardiogram signals using a plurality of sensors. For example, the electrocardiograph 10 may be a terminal, a patch type, or a wearable product. In addition, the posture information may include position and angle information of the electrocardiograph 10. The electrocardiograph 10 may be attached in a specific electrocardiogram lead direction to acquire electrocardiogram signals. In addition, the electrocardiograph 10 may include an electrocardiograph device for acquiring posture information and an electrode (sensor) for acquiring electrocardiogram signals. For example, the posture information may include information about position and direction of the current electrocardiograph 10.

The electrocardiograph 10 needs to be directed and attached to a part of a body (e.g., near the heart) of the patient 30. The electrocardiograph 10 should be attached to the position and direction of a predetermined electrode to acquire an accurate waveform of the electrocardiogram. The electrocardiogram in the range of several mV measured around the heart is filtered through a low pass filter (LPF) and applied as an input of an instrumentation amplifier (IA) through a buffer. At the IA stage, an electrocardiogram waveform is output by amplifying 1000 times, and electrocardiogram signals in the range of 1 Hz to 35 Hz by a band pass filter (BPF) which is a combination of the LPF connected with the IA stage output and a high pass filter (HPF). In addition, the electrocardiograph 10 may filter analog ECG signals by hardware capable of measuring ECG signals and driving the hardware and convert the analog ECG signals into digital signals to transmit the converted signals to the user terminal 20. In addition, the electrocardiograph 10 may transmit only electrocardiogram signals converted into digital signals through an analog-to-digital converter to the user terminal 20. For example, the analog-to-digital converter may have 24-bit resolution and a sampling frequency of 250 Hz. However, the configuration of the electrocardiograph 10 is not limited thereto.

According to an exemplary embodiment of the present invention, the user terminal 20 may provide guide information for guiding the attachment direction of the electrocardiograph 10 based on the posture information acquired from the electrocardiograph 10. The guide information may be used to provide information on the attachment direction of the electrocardiograph 10 to be attached to acquire existing standardized electrocardiogram signals. In other words, the user terminal 20 may provide feedback information so that the direction information in which the electrocardiograph 10 is attached to the part of the body of the patient 30 may be attached in a direction of the user's intended electrocardiogram lead.

For example, the user terminal 20 may receive user input information for measuring an electrocardiogram in a lead 1 direction. The user terminal 20 may provide guide information so that the electrocardiograph 10 is positioned on the left chest (on the nipple) of the patient 30. In addition, in order to measure the electrocardiogram in the lead 1 direction, the user terminal 20 may provide guide information so that a positive (+) electrode provided in the electrocardiograph 10 is positioned close to a left arm LA of the patient 20 and a negative (−) electrode is positioned close to a right arm RA of the patient 20. In addition, the electrocardiograph 10 may estimate an angle difference between the first direction including preset reference information of preset lead 1 and direction information acquired based on a sensor. The user terminal 20 may provide different output characteristics of the guide information based on the angle difference information estimated from the electrocardiograph 10.

Illustratively, for the electrocardiogram lead, medically and academically, measurement directions Lead I, II, III, aVL, aVR, aVF, V1, V2, V3, V4, V5, and V6 have already been standardized. Standard 12-lead electrocardiograms are divided into bipolar leads, which record a potential difference between two parts, and unipolar leads, which record a potential at a part to which the electrode is attached. The standard bipolar leads may be divided into Leads I, II, and III. Lead I is a voltage between a left arm (LA) electrode and a right arm (RA) electrode (I=LA−RA). Lead II is a voltage between a left leg (LL) electrode and a right arm (RA) electrode (II=LL−RA). Lead III is a voltage between a left leg (LL) electrode and a left arm (LA) electrode.

In addition, unipolar limb leads are divided into aVL, aVR, and aVF, and electrodes are connected to the right hand, left hand, and left foot to record an electrocardiogram. However, since the electrocardiogram waveform recorded by the unipolar limb leads is small in size, aVR, aVL, and aVF amplified with the electrocardiogram waveform by 1.5 times are used. Here, a is the first letter of augmented. Precordial leads are divided into V1, V2, V3, V4, V5, and V6, and the standard leads or the limb leads have a disadvantage of recording the electrocardiogram at a region far away from the heart, but the precordial leads only record the electrocardiogram at a region closer to the heart. For the positions of each precordial lead, V1 may be located right next to the right sternum in the fourth intercostal space (between ribs 4 and 5). V2 may be located right next to the left sternum in the fourth intercostal space (between ribs 4 and 5). V3 may be located in the middle region between V2 and V4. V4 may be located at the midclavicular line of the fifth intercostal space (between ribs 5 and 6). V5 may be located at the left of the anterior armpit horizontally in parallel with V4. V6 may be located on the midaxillary line horizontally in parallel with V4 and V5.

According to an exemplary embodiment of the present invention, the user terminal 20 may output an electrocardiogram lead guide menu, an electrocardiogram measurement menu, an electrocardiograph attachment guide menu, and the like. For example, an application program for providing the electrocardiogram lead guide menu and the electrocardiogram measurement menu is installed in the user terminal 20, and the electrocardiogram lead guide menu, the electrocardiogram measurement menu, and the electrocardiograph attachment guide menu may be provided through the installed application.

The electrocardiograph 10 may include all types of servers, terminals, or devices which have functions of transmitting and receiving data, contents, and various communication signals to and from the user terminal 20 via a network, and storing and processing data.

The user terminal 20 is a device that interworks with the electrocardiograph 10 via a network, and may also include, for example, all types of wireless communication devices, such as personal communication system (PCS) such as a smartphone, a smart pad, a tablet PC, a wearable device, etc., global system for mobile communication (GSM), personal digital cellular (PDC), personal handyphone system (PHS), personal digital assistant (PDA), international mobile telecommunication (IMT)-2000, code division multiple access (CDMA)-2000, w-code division multiple access (W-CDMA), and wireless broadband Internet (Wibro) terminals, and fixed terminals such as a desktop computer and a smart TV.

Examples of a network for sharing information between the electrocardiograph 10 and the user terminal 20 may include 3rd generation partnership project (3GPP) network, long term evolution (LTE) network, 5G network, world interoperability for microwave access (WIMAX) network, wired and wireless Internet, local area network (LAN), wireless local area network (Wireless LAN), wide area network (WAN), personal area network (PAN), Bluetooth network, Wifi network, near field communication (NFC) network, satellite broadcasting network, analog broadcasting network, digital multimedia broadcasting (DMB) network, and the like, but are not limited thereto.

Figure 2:
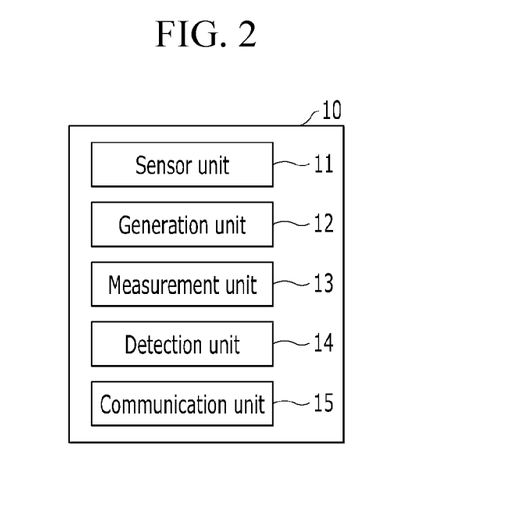
FIG. 2 is a schematic block diagram of an electrocardiograph of the electrocardiogram lead guide system according to an exemplary embodiment of the present invention.

FIG. 2 is a schematic block diagram of the electrocardiograph of the electrocardiogram lead guide system according to an exemplary embodiment of the present invention.

Referring to FIG. 2, the electrocardiograph 10 according to an exemplary embodiment of the present invention may include a sensor unit 11, a generation unit 12, a detection unit 14, and a communication unit 14. However, the configuration of the electrocardiograph 10 is not limited thereto. For example, the electrocardiograph 10 may include a power supply unit (not illustrated) for applying power.

According to an exemplary embodiment of the present invention, the sensor unit 11 may acquire position and angle information using a plurality of sensors. In other words, the sensor unit 11 may acquire position and angle information of the electrocardiograph 10 using an acceleration sensor and a gyro sensor. For example, the plurality of sensors may be an acceleration sensor and a gyro sensor. The sensor unit 11 may acquire position and angle information of the electrocardiograph 10 using an acceleration sensor and a gyro sensor. In addition, the sensor unit 11 may acquire current position and angle information of the electrocardiograph 10 including information on an X coordinate, a Y coordinate, a Z coordinate, and the like using the plurality of sensors. In addition, the sensor unit 11 may acquire current position and angle information including information on a roll, a pitch, a yaw, and the like.

For example, the acceleration sensor is a sensor that measures a dynamic force such as acceleration, vibration, impact, or the like of an object, and refers to a sensor capable of detecting a motion state of an object. The gyro sensor measures angular velocity, unlike an acceleration sensor that measures acceleration. As another example, the plurality of sensors of the sensor unit 11 may include an accelerometer, an angular velocimeter, a geomagnetic meter, a GPS, a computer vision, and the like.

In addition, the sensor unit 11 may include electrodes (sensors). The sensor unit 11 may acquire electrocardiogram signals of the patient 30 from the electrodes (sensors). The sensor unit 11 may acquire ECG signals. The ECG signals are called electrocardiogram or electrocardiogram signals, and refer to those recorded in the form of wavelengths by analyzing the electrical activity of the heart. More specifically, the ECG signals are waveforms consisting of a vector sum of action potentials generated by the special excitatory & conductive system of the heart. That is, the ECG signals are signals that measure, from electrodes contacted outside the body, vector sum signals of the action potentials generated from the sinoatrial node (SA node), the atrioventricular node (AV node), the His bundle, the His bundle branch, furkinje fibers, and the like, which are components of the heart. When measuring the electrocardiogram, two or more electrodes are used, and the electrodes are paired.

Although the ECG signals, the electrocardiogram, or the electrocardiogram signals described above are used interchangeably, they are not different from each other and may be used interchangeably.

According to an exemplary embodiment of the present invention, the generation unit 12 may predict current posture information of the electrocardiograph based on the position and angle information of the electrocardiograph acquired from the sensor unit 11. For example, the generation unit 12 may calculate a current position and a current posture of the electrocardiograph 10. The generation unit 12 may predict the current position of the electrocardiograph 10 including information on an X coordinate, a Y coordinate, a Z coordinate, and the like, and predict the current posture of the electrocardiograph 10 including information on a roll, a pitch, a yaw, and the like. The roll refers to rotation in front and rear axes, the pitch refers to up and down movement of the electrocardiograph 10, and the yaw refers to an angle tilted to one side. The generation unit 12 may generate direction information by calculating a current position and a current posture (angle) of the electrocardiograph 10.

In addition, the generation unit 12 may calculate an angle difference between reference posture information and current posture information to estimate a difference between the reference posture information and the current posture information. The reference posture information may be set in response to each of a plurality of pieces of reference direction information. In addition, the generation unit 12 may estimate an angle difference between preset first reference posture information and the current posture information. In addition, the generation unit 12 may estimate an angle difference between preset second reference posture information and the current posture information. In addition, the generation unit 12 may estimate an angle difference between preset third reference posture information and the current posture information. Here, the first reference posture information may be information associated with Lead I. In addition, the second reference posture information may be information associated with Lead II. In addition, the third reference posture information may be information associated with Lead III.

Figure 4:
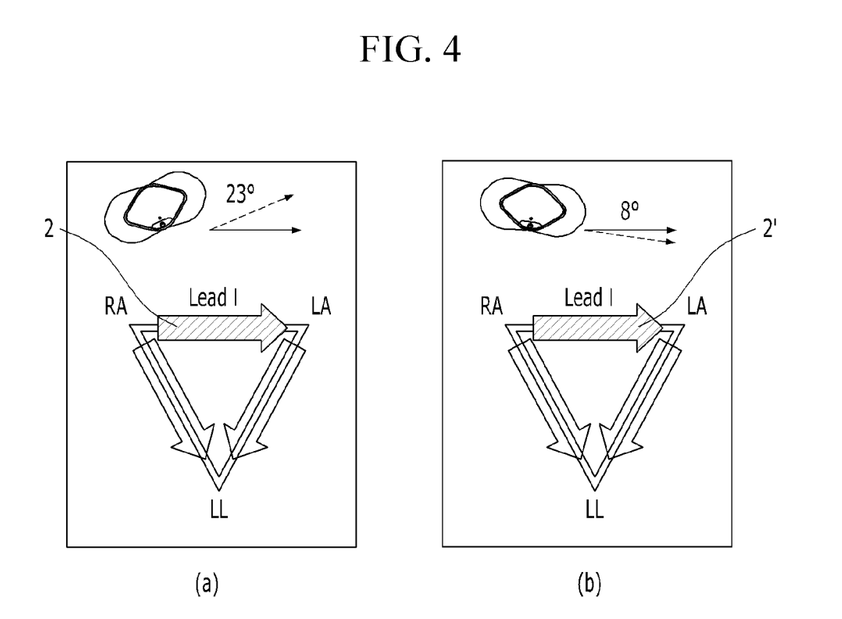
FIG. 4 is a diagram schematically illustrating an attachment direction of the electrocardiograph of the electrocardiogram lead guide system according to an exemplary embodiment of the present invention.

FIG. 4 is a diagram schematically illustrating an attachment direction of the electrocardiograph of the electrocardiogram lead guide system according to an exemplary embodiment of the present invention.

With reference to the reference posture information, illustratively, referring to FIG. 4A, Lead I is for recording a potential difference between a left arm electrode (+) and a right arm electrode (−), and needs to be located so that the − and + electrodes of the electrocardiograph 10 are horizontal with each other. In other words, the reference posture information of Lead I may be a case in which the − electrode and the + electrode are in a horizontal state.

In addition, referring to FIG. 4B, Lead II is for recording a potential difference between a left foot electrode (+) and a right hand electrode (−), and may be tilted at a specific angle (e.g., −44°) based on the + electrode of the electrocardiograph 10 to acquire electrocardiogram signals. In other words, the reference posture information of Lead II may be a case in which the − electrode and the + electrode are tilted at a specific angle. For example, in the electrocardiograph 10, in order to measure the electrocardiogram in the direction of Lead II, the − electrode may be positioned to be tilted in the right-hand direction and the + electrode may be positioned to be tilted in the left-foot direction.

In addition, referring to FIG. 4C, Lead III is for recording a potential difference between a left foot electrode (+) and a left foot electrode (−), and may be tilted at a specific angle (e.g., −134°) based on the + electrode of the electrocardiograph 10 to acquire electrocardiogram signals. In other words, the reference posture information of Lead II may be a case in which the − electrode and the + electrode are tilted at a specific angle. For example, in the electrocardiograph 10, in order to measure the electrocardiogram in the direction of Lead III, the − electrode may be positioned to be tilted in the left-hand direction and the + electrode may be positioned to be tilted in the left-foot direction.

In addition, the generation unit 12 may estimate an angle difference between preset reference posture information and the current posture information. Illustratively, referring to FIG. 4, a blue line illustrated in FIGS. 4A and 4B may be referred to as the reference posture information of Lead I, and a red line may be referred to as the current posture information. When the reference posture information and the current posture information of Lead I match each other, the generation unit 12 may generate angle information of the current posture information of the electrocardiograph 10 as 0°. In addition, when a difference between the reference posture information and the current posture information of Lead I is 23° as illustrated in FIG. 4A, the generation unit 12 may generate angle information of the current posture information of the electrocardiograph 10 as 23°. In addition, when the difference between the reference posture information and the current posture information of Lead I is −8° as illustrated in FIG. 4A, the generation unit 12 may generate angle information of the current posture information of the electrocardiograph 10 as −8°.

According to an exemplary embodiment of the present invention, the detection unit 13 may detect whether to be attached to the part of the body of the patient 30. For example, the detection unit 13 may detect whether the electrode (sensor) has been attached to the part of the body (e.g., on the left chest nipple) of the patient 30. The detection unit 13 may detect the attachment based on a temperature, an electrocardiogram acquisition signal, etc., but is not limited thereto.

According to an exemplary embodiment of the present invention, the communication unit 14 may transmit current posture information and electrocardiogram lead signals to the user terminal 20. In addition, the communication unit 14 may transmit an angle difference between preset reference posture information and current posture information to the user terminal 20. For example, the communication unit 15 may transmit the information and signals acquired from the electrocardiograph 10 to the user terminal 20 via a network.

The communication unit 15 may transmit direction information and electrocardiogram lead signals to the user terminal 20 via a network such as Bluetooth or Wi-Fi.

In addition, when the attachment detected by the detection unit 13 is On, the communication unit 14 may provide (transmit), to the user terminal 20, the angle difference information between the preset reference posture information and the current posture information estimated by the generation unit 12 and the electrocardiogram signals. Since when the attachment detected by the detection unit 13 is On, the electrode (sensor) may acquire the electrocardiogram signals, when the attachment detected by the detection unit 13 is On, the communication unit 14 may provide (transmit), to the user terminal 20, the angle difference information estimated by the generation unit 12 and the electrocardiogram signals acquired from the sensor unit 11.

On the other hand, when the attachment detected by the detection unit 13 is Off, the communication unit 14 may provide (transmit), to the user terminal 20, the angle difference information between the preset reference posture information and the current posture information estimated by the generation unit 12.

Figure 3:
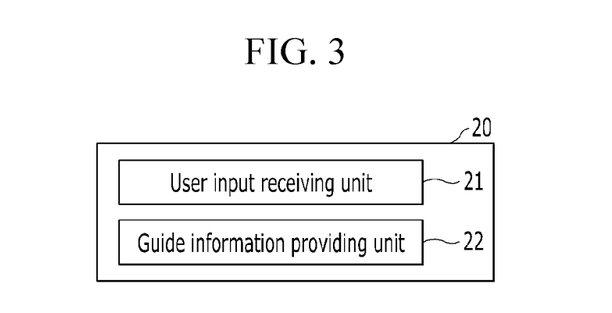
FIG. 3 is a schematic block diagram of a user terminal of the electrocardiogram lead guide system according to an exemplary embodiment of the present invention.

FIG. 3 is a schematic block diagram of a user terminal of the electrocardiogram lead guide system according to an exemplary embodiment of the present invention.

Referring to FIG. 3, the user terminal 20 according to an exemplary embodiment of the present invention may include a user input receiving unit 21 and a guide information providing unit 22. However, the configuration of the user terminal 20 is not limited thereto. For example, the user terminal 20 may include a data storage unit (not illustrated) for storing information received from the electrocardiograph 10.

According to an exemplary embodiment of the present invention, the user input receiving unit 21 may receive user input information for selecting at least one of a plurality of reference direction information items. For example, the plurality of reference direction information items may include a Lead I direction information item, a Lead II direction information item, and a Lead III direction information item. The user may select any one of electrocardiogram lead direction items to be acquired from among the plurality of reference direction information items. For example, the user input receiving unit 21 may receive user input information corresponding to the Lead I direction information item. The guide information providing unit 22 may provide guide information associated with position and direction information to be attached with the electrocardiograph 10 in order to acquire a Lead I direction electrocardiogram measurement signal in response to the Lead I direction information item that is the user input information.

According to an exemplary embodiment of the present invention, the guide information providing unit 22 may provide guide information based on the user input information and the angle difference information provided from the electrocardiograph. In other words, the guide information providing unit 22 may provide guide information for guiding the attachment direction of the electrocardiograph 10 based on the user input information and the angle difference information between the preset reference posture information and the current posture information provided from the electrocardiograph 10. For example, the guide information providing unit 22 may provide guide information associated with position and direction information to be attached with the electrocardiograph 10 in order to acquire a Lead I direction electrocardiogram measurement signal in response to the Lead I direction information item that is the user input information. In addition, the guide information providing unit 22 may provide guide information so that the current posture information and the preset reference posture information match each other, based on the angle difference information provided from the electrocardiograph 10.

Figure 5:
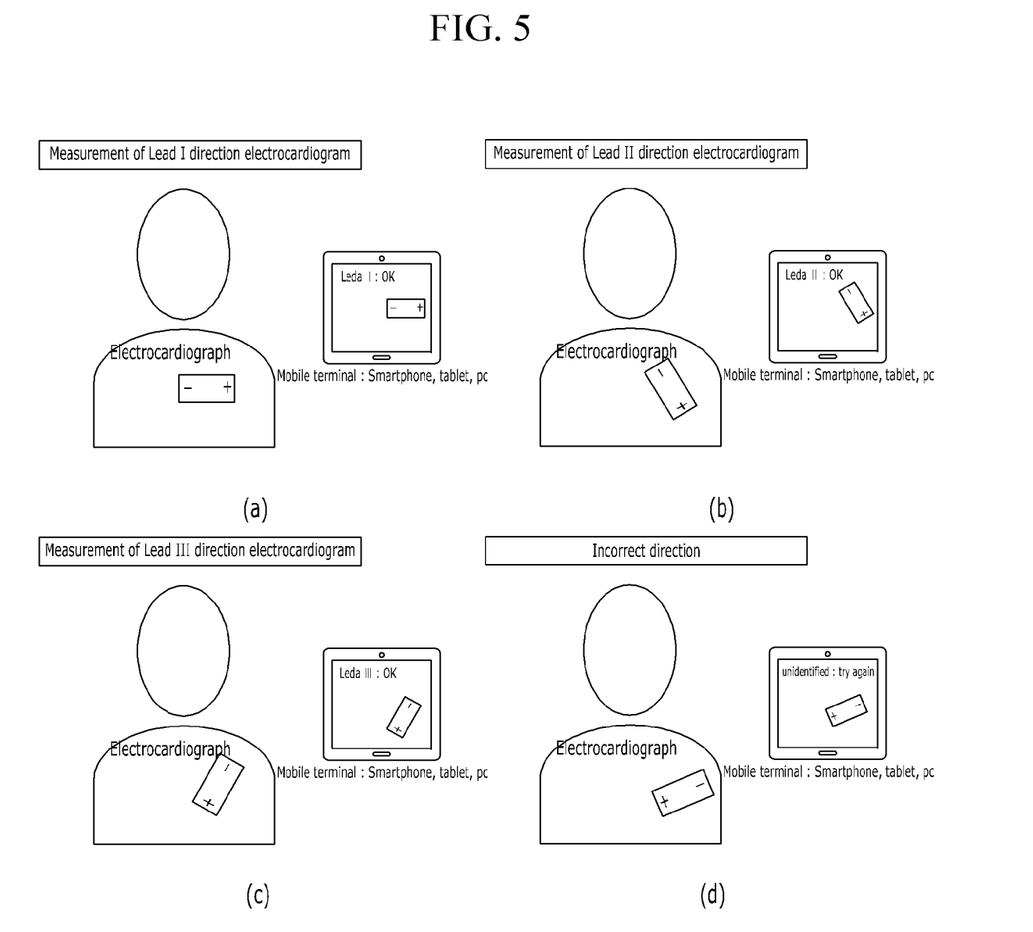
FIG. 5 is a diagram illustrating an example of outputting guide information using the electrocardiogram lead guide system according to an exemplary embodiment of the present invention.

FIG. 5 is a diagram illustrating an example of outputting guide information using the electrocardiogram lead guide system according to an exemplary embodiment of the present invention.

In addition, the guide information providing unit 22 may vary output characteristics of the guide information based on the user input information and the angle difference information. As an example, the output characteristics may include at least one of blinking speed, vibration, and sound. In order words, the guide information providing unit 22 may vary output characteristics of the guide information based on the attachment direction of the electrocardiograph 10 associated with the reference posture information corresponding to the user input information and the angle difference information between the preset reference posture information and the current posture information provided from the electrocardiograph 10. The guide information providing unit 22 may change the blinking speed based on the angle difference corresponding to reference information of a preset angle, respectively. For example, when the angle difference information is ±60° or more, the guide information providing unit 22 may vary the output characteristics by blinking at a cycle of 2 seconds. In addition, in the case of ±30° or more and less than ±60°, the guide information providing unit 22 may vary the output characteristics by blinking at a cycle of 1.5 seconds. In addition, in the case of ±10° or more and less than ±30°, the guide information providing unit 22 may vary the output characteristics by blinking at a cycle of 1.0 second. In addition, in the case of ±5° or more and less than ±10°, the guide information providing unit 22 may vary the output characteristics by blinking at a cycle of 0.5 seconds. In addition, in the case of less than ±5°, the guide information providing unit 22 may vary the output characteristics by stopping red blinking and displaying blue.

Illustratively, referring to FIG. 5A, the guide information providing unit 22 may allow a first arrow 2 to be output in red when the user input receiving unit 21 receives the user input information corresponding to the Lead I direction information item. In addition, the guide information providing unit 22 may change output characteristics of the first arrow 2 based on the angle difference information, that is, the angle difference information between the preset first reference posture information and the current posture information. The guide information providing unit 22 may receive the angle difference information of 23° from the electrocardiograph 10, and change the output characteristics of the first arrow 2 based on the output characteristics corresponding to the preset angle difference information. In the case of FIG. 5A, since the angle difference information is 23°, the guide information providing unit 22 may change the output characteristics so that the first arrow 2 blinks at a cycle of 1.0 second.

In addition, referring to FIG. 5B, the guide information providing unit 22 may allow a second arrow 2' to be output in red when the user input receiving unit 21 receives the user input information corresponding to the Lead I direction information item. In addition, the guide information providing unit 22 may change the output characteristics of the second arrow 2' based on the angle difference information, that is, the angle difference information between the preset second reference posture information and the current posture information. The guide information providing unit 22 may receive the angle difference information of −8° from the electrocardiograph 10, and change the output characteristics of the second arrow 2' based on the output characteristics corresponding to the preset angle difference information. In the case of FIG. 5B, since the angle difference information is −8°, the guide information providing unit 22 may change the output characteristics so that the second arrow 2' blinks at a cycle of 0.5 seconds.

Figure 6:
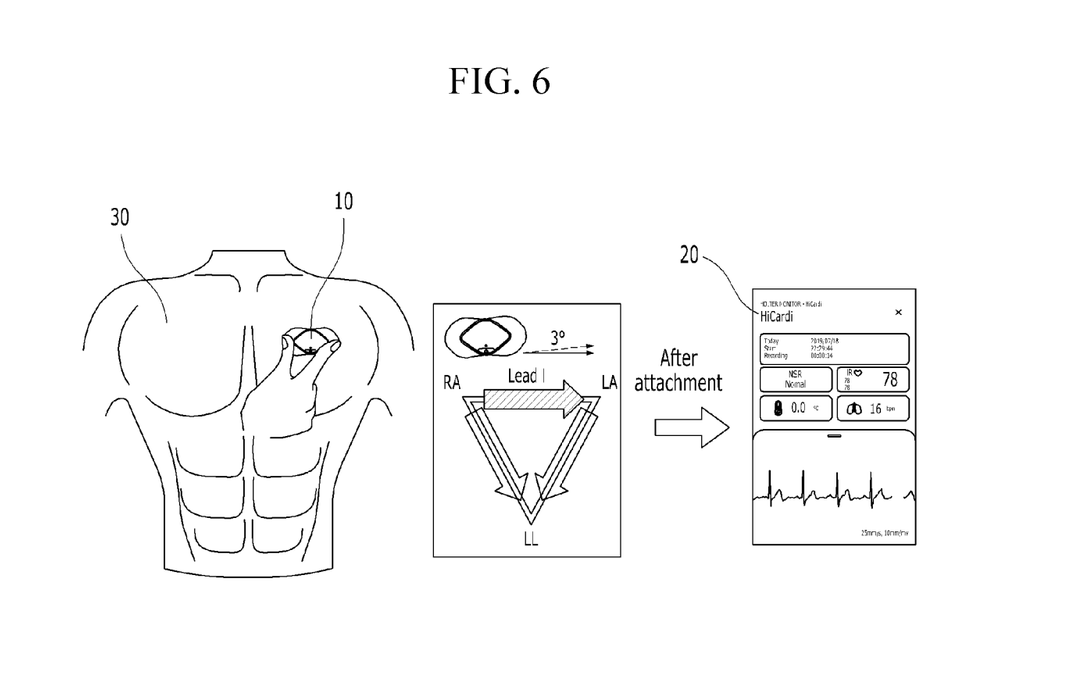
FIG. 6 is a diagram schematically illustrating results measured using the electrocardiogram lead guide system according to an exemplary embodiment of the present invention.

FIG. 6 is a diagram schematically illustrating results measured using the electrocardiogram lead guide system according to an exemplary embodiment of the present invention.

According to an exemplary embodiment of the present invention, a user may prepare the electrocardiograph 10 and the user terminal 20 to receive an electrocardiogram lead guide method.

The user may attach an electrode (sensor) to an electrocardiograph and turn on the electrocardiograph. In addition, the user may receive an electrocardiogram lead guide method by executing an electrocardiogram lead guide application downloaded to the user terminal 20.

The user may select at least one of Leads I, II, and III to be measured in the electrocardiogram lead guide application downloaded to the user terminal 20. The user terminal 20 may vary an output of any one of arrows of a lead selected in a triangle based on user input information.

The user positions an electrode attachment surface of the electrocardiograph 10 on the left chest (on the nipple) toward the body surface and without being attached to the body surface. The electrocardiograph 10 may predict current posture information. In addition, the electrocardiograph 10 may estimate an angle difference between the preset reference posture information and the current posture information, and transmit the estimated angle difference information to the user terminal 20. The user terminal 20 may display a difference between the direction of the electrocardiograph 10 and the input information (information of the selected lead) of the user with an angle and an arrow. In addition, the user terminal 20 may output differently the blinking speed of the arrow based on the estimated angle difference information.

The user may adjust the position of the electrocardiograph 10 so that the angle difference information displayed on the user terminal 20 is within 5°, and attach the electrocardiograph 10 to the part of the body of the patient 30 when the angle difference information displayed on the user terminal 20 is within 5° and then the blinking of the letter of the arrow stops.

The user terminal 20 may output electrocardiogram signals and heart rate information acquired from the electrocardiograph 10 when the electrocardiograph 10 is attached to the part of the body of the patient 30.

Hereinafter, an operational flow of the present invention will be briefly described based on the contents described above in detail.

Figure 7:
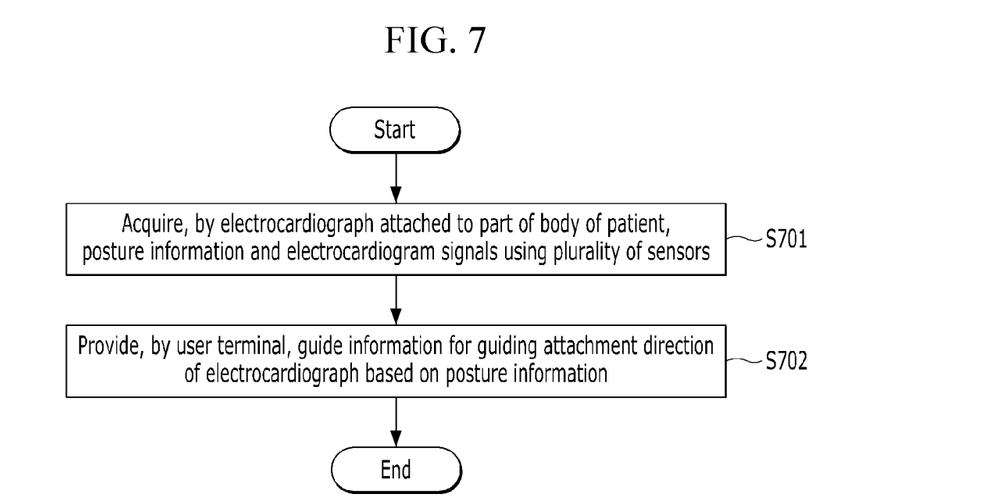
FIG. 7 is an operational flowchart of an electrocardiogram lead guide method according to an exemplary embodiment of the present invention.

FIG. 7 is an operation flowchart for an electrocardiogram lead guide method according to an exemplary embodiment of the present invention.

The electrocardiogram lead guide method illustrated in FIG. 7 may be performed by the electrocardiogram lead guide system 1 described above.

Accordingly, even if omitted below, the description of the electrocardiogram lead guide system 1 may be equally applied even to the description of the electrocardiogram lead guide method.

In step S701, the electrocardiogram lead guide system 1 may acquire posture information and electrocardiogram signals using a plurality of sensors.

In step S702, the electrocardiogram lead guide system 1 may provide guide information for guiding the attachment direction of the electrocardiograph based on the posture information.

In the above description, steps S701 and S702 may be further divided into additional steps or may be combined with fewer steps according to an exemplary embodiment of the present invention. In addition, some steps may also be omitted if necessary, or the order between the steps may also be changed.

The electrocardiogram lead guide method according to the exemplary embodiment of the present invention may be implemented in a form of program instructions which may be performed through various computer means to be recorded in a computer readable medium. The computer readable medium may include program instructions, data files, data structures, and the like alone or in combination. The program instructions recorded in the medium may be specially designed and configured for the present invention, or may be publicly known to and used by those skilled in the computer software art. Examples of the computer readable medium include magnetic media, such as a hard disk, a floppy disk, and a magnetic tape, optical media such as a CD-ROM and a DVD, magneto-optical media such as a floptical disk, and hardware devices such as a ROM, a RAM, and a flash memory, which are specially configured to store and execute the program instructions. Examples of the program instructions include high language codes executable by a computer using an interpreter and the like, as well as machine language codes created by a compiler. The hardware device may be configured to be operated with one or more software modules in order to perform the operation of the present invention and vice versa.

Further, the aforementioned electrocardiogram lead guide method may be implemented even in the form of computer programs or applications to be executed by a computer, which are stored in the recording medium.

The aforementioned description of the present invention is to be exemplified, and it will be understood by those skilled in the art that the present invention can be easily modified in other detailed forms without changing the technical spirit or required features of the present invention. Therefore, it should be appreciated that the exemplary embodiments described above are illustrative in all aspects and are not restricted. For example, respective components described as single types can be distributed and implemented, and similarly, components described to be distributed can also be implemented in a coupled form.

The scope of the present invention is represented by appended claims to be described below rather than the detailed description, and it is to be interpreted that the meaning and scope of the claims and all the changes or modified forms derived from the equivalents thereof come within the scope of the present invention.

What is claimed:

1. An electrocardiogram lead guide system comprising:
an electrocardiograph adapted of a body of a patient and acquiring posture information and electrocardiogram signals using a plurality of sensors, wherein the electrocardiograph includes a generation unit, and the generation unit:
predicts current posture information of the electrocardiograph based on position and angle information of the electrocardiograph;

estimates a first angle difference between the current posture information and preset first reference posture information associated with a first lead, wherein the first lead provides a voltage between a left arm electrode and a right arm electrode, and the preset first reference posture information is a case in which the left arm electrode and the right arm electrode are in a horizontal state, estimates a second angle difference between the current posture information and preset second reference posture information associated with a second lead, wherein the second lead provides a voltage between a left leg electrode and the right arm electrode, and the preset second reference posture information is a case in which the right arm electrode is tilted in a direction of the right arm and the left leg electrode is tilted in a direction of the left leg, and estimates a third angle difference between the current posture information and preset third reference posture information associated with a third lead, wherein the third lead provides a voltage between the left leg electrode and the left arm electrode, and the preset third reference posture information is a case in which the left arm electrode is tilted in a direction of the left arm and the left leg electrode is tilted in the direction of the left leg; and generates angle difference information comprising the first angle difference through the third angle differences; and a user terminal providing guide information for guiding an attachment direction of the electrocardiograph based on the posture information, the current posture information, and the angle difference information, wherein:

the user terminal comprises:

a user input receiving unit which receives user input information indicating a user selection of at least one of a plurality of reference direction information items; and a guide information providing unit which provides guide information based on the user input information and the angle difference information, wherein the guide information comprises one or more indicators, and the guide information providing unit sets or varies a blinking speed of the one or more indicators based on the user input information and the angle difference information, wherein the guide information providing unit:

sets the blinking speed to zero for a case where an angle difference included in the angle difference information is greater than zero and less than a first threshold value;

sets the blinking speed to a first speed greater than zero for a case where the angle difference is greater than the first threshold value and less than a second threshold value; and sets the blinking speed to a second speed less than the first speed for a case where the angle difference is greater than the second threshold value.

2. The electrocardiogram lead guide system of claim 1, wherein the electrocardiograph includes:

a sensor unit acquiring the position and angle information of the electrocardiograph using a plurality of sensors;

a detection unit detecting the electrocardiograph is located at the part of the body of the patient; and a communication unit transmitting the current posture information and the electrocardiogram lead signals to the user terminal.

3. The electrocardiogram lead guide system of claim 2, wherein the sensor unit acquires the position and angle information of the electrocardiograph using an acceleration sensor and a gyro sensor.

4. The electrocardiogram lead guide system of claim 3, wherein the communication unit provides, to the user terminal, the angle difference information estimated by the generation unit and the electrocardiogram signals, when the attachment detected by the detection unit is On, and the communication unit provides, to the user terminal, the angle difference information estimated by the generation unit, when the attachment detected by the detection unit is Off.

5. The electrocardiogram lead guide system of claim 1, wherein the guide information providing unit varies output characteristics of the guide information based on the user input information and the angle difference information.

6. An electrocardiogram lead guide method comprising steps of:

acquiring, by an electrocardiograph adapted of a body of a patient, posture information and electrocardiogram signals using a plurality of sensors;

predicting current posture information of the electrocardiogram position and angle information of the electrocardiograph;

estimating a first angle difference between the current posture information and preset first reference posture information associated with a first lead, wherein the first lead provides a voltage between a left arm electrode and a right arm electrode, and the preset first reference posture information is a case in which the left arm electrode and the right arm electrode are in a horizontal state, estimating a second angle difference between the current posture information and preset second reference posture information associated with a second lead, wherein the second lead provides a voltage between a left leg electrode and the right arm electrode, and the preset second reference posture information is a case in which the right arm electrode is tilted in a direction of the right arm and the left leg electrode is tilted in a direction of the left leg, and estimating a third angle difference between the current posture information and preset third reference posture information associated with a third lead, wherein the third lead provides a voltage between the left leg electrode and the left arm electrode, and the preset third reference posture information is a case in which the left arm electrode is tilted in a direction of the left arm and the left leg electrode is tilted in the direction of the left leg;

generating angle difference information comprising the first angle difference through the third angle difference;

providing, by a user terminal, guide information for guiding an attachment direction of the electrocardiograph based on the posture information, the current posture information, and the angle difference information;

receiving, by the user terminal, user input information indicating a user selection of at least one of a plurality of reference direction information items comprising: a first direction information item associated with the first lead, a second direction information item associated with the second lead, and a third direction information item associated with the third lead; and providing, by the user terminal, guide information based on the user input information and the angle difference information, wherein the guide information comprises one or more indicators, and wherein providing the guide information comprises setting or varying a blinking speed of the one or more indicators based on the user input information and the angle difference information, wherein setting or varying the blinking speed comprises:

setting the blinking speed to zero for a case where an angle difference included in the angle difference information is greater than zero and less than a first threshold value;

setting the blinking speed to a first speed greater than zero for a case where the angle difference is greater than the first threshold value and less than a second threshold value; and setting the blinking speed to a second speed less than the first speed for a case where the angle difference is greater than the second threshold value.

* * * * *